US009374588B2

(12) United States Patent
Frigo et al.

(10) Patent No.: US 9,374,588 B2
(45) Date of Patent: Jun. 21, 2016

(54) RATE CONTROL METHOD AND SYSTEM

(71) Applicant: QUANTA COMPUTER, INC., Tao Yuan Shien (TW)

(72) Inventors: Matteo Frigo, Acton, MA (US); Daniel Seth Nussbaum, Cambridge, MA (US)

(73) Assignee: QUANTA COMPUTER, INC. (TW)

(*) Notice: Subject to any disclaimer, the term of this patent is extended or adjusted under 35 U.S.C. 154(b) by 214 days.

(21) Appl. No.: 14/173,259

(22) Filed: Feb. 5, 2014

(65) Prior Publication Data

US 2014/0269905 A1 Sep. 18, 2014

Related U.S. Application Data

(60) Provisional application No. 61/785,270, filed on Mar. 14, 2013.

(51) Int. Cl.

| | |
|---|---|
| ***H04N 19/00*** | (2014.01) |
| ***H04N 19/126*** | (2014.01) |
| ***H04N 19/15*** | (2014.01) |
| ***H04N 19/436*** | (2014.01) |
| ***H04N 19/124*** | (2014.01) |
| ***H04N 19/146*** | (2014.01) |

(52) U.S. Cl.

CPC ........... *H04N 19/126* (2014.11); *H04N 19/124* (2014.11); *H04N 19/146* (2014.11); *H04N 19/15* (2014.11); *H04N 19/436* (2014.11)

(58) Field of Classification Search

CPC .......................... H04N 19/126; H04N 19/436

USPC .................................................... 375/240.03

See application file for complete search history.

(56) References Cited

U.S. PATENT DOCUMENTS 5,682,204 A * 10/1997 Uz ....................... H04N 19/147 375/240.15

2012/0281748 A1 * 11/2012 Peng .................... H04N 19/149 375/240.01

* cited by examiner

*Primary Examiner* — Jeffery Williams

(74) *Attorney, Agent, or Firm* — SU IP Consulting

(57) ABSTRACT

An example method to perform rate control in a parallel encoding system including a plurality of parallel encoders is disclosed. The method may comprise determining a quantization parameter for one of the plurality of parallel encoders based on a measure of parallelism of the plurality of parallel encoders. The method may further comprise providing the quantization parameter to the one of the plurality of parallel encoders to encode a chunk of a video sequence to generate an encoded chunk based on the quantization parameter.

17 Claims, 5 Drawing Sheets

RATE CONTROL METHOD AND SYSTEM

CROSS-REFERENCE TO RELATED APPLICATION

This application claims the benefit of U.S. Provisional Application No. 61/785,270, filed Mar. 14, 2013. This provisional application, including any appendices or attachments thereof, is hereby incorporated by reference in its entirety.

BACKGROUND

Unless otherwise indicated herein, the approaches described in this section are not prior art to the claims in this application and are not admitted to be prior art by inclusion in this section.

In order to transmit digital video frames over band-limited transmission channels, or to store and retrieve digital video frames using digital storage equipment, compression techniques are employed to reduce data bandwidth while minimizing loss in data quality. For example, an MPEG-2 encoder accepts an input sequence of raw video frames and outputs a sequence of encoded video frames. A control parameter of the encoder, traditionally called Quantization Parameter (QP), controls the "quality" of the encoded output, that is, how good the output looks to the human eye.

By convention in MPEG-2, a lower value of QP produces output of higher quality. QP also affects the size of the output, that is, the number of bits needed to encode the output frame. However, this influence is only indirect because the size of the output frame is a function both of QP and of the "complexity" of the input frames. Loosely speaking, for a given level of quality, a more complex video sequence requires more bits. Similarly, for a given complexity, a higher quality requires more bits.

Although the encoder is parameterized by QP, many applications impose a constraint not on the quality, but on the number of output bits produced by the encoder. For example, if the encoded video frames are sent through a network that can transmit N bits per second, the encoder must produce at most N bits per second. The relation between QP and output size is indirect, since the number of output bits is also affected by the complexity of the input sequence. Therefore, setting the QP that achieves the desired output rate is generally difficult.

DETAILED DESCRIPTION

Figure 1:
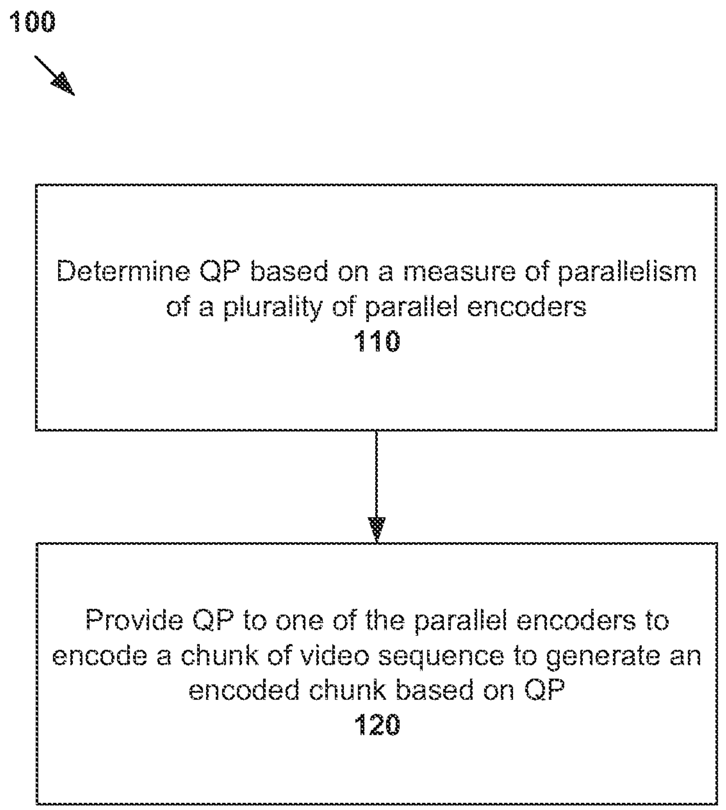
FIG. 1 is a flowchart of an example process to perform rate control in a parallel encoding system comprising a plurality of parallel encoders, in accordance with at least some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Throughout the present disclosure, an example control parameter of an encoder, such as the Quantization Parameter (QP), can be used to control the "quality" of the encoded output. The term "rate control" generally refers to techniques for inferring a value of QP that maintains the desired rate at which output bits are produced. The term "parallel encoding system" generally refers to a system capable of performing multiple encoding operations at substantially the same time using a plurality of parallel encoders.

FIG. 1 is a flowchart of an example process to perform rate control in a parallel encoding system comprising a plurality of parallel encoders, in accordance with at least some embodiments of the present disclosure. Process 100 may include one or more operations, functions, or actions illustrated by one or more blocks, such as blocks 110 and 120. The various blocks may be combined into fewer blocks, divided into additional blocks, and/or eliminated based upon the desired implementation.

At block 110, a quantization parameter is determined for one of the plurality of parallel encoders based on a measure of parallelism associated with the plurality of parallel encoders. The measure of parallelism, also referred to as P throughout the present disclosure, corresponds to a number of chunks of a video sequence that the plurality of parallel encoders process in parallel. In some embodiments, P may correspond to a maximum number of chunks of the video sequence that the plurality of parallel encoders are capable of processing in parallel. P may also correspond to a maximum number of chunks of the video sequence that the plurality of parallel encoders ever processed in parallel.

At block 120, the quantization parameter is provided to the one of the plurality of parallel encoders to encode one chunk of the video sequence to generate an encoded chunk based on the quantization parameter.

In accordance with at least some embodiments of the present disclosure, determining the quantization parameter based on the measure of parallelism may improve the stability of rate control in a parallel encoding system. In particular, since the encoders operate independently, the measure of parallelism may be used in rate control to avoid or reduce the likelihood of the quantization parameter not converging over time due to large effective gain of the parallel encoders.

Further, the example process in FIG. 1 may reduce encoding time and increase output rate, thereby facilitating real-time video encoding. The example process in FIG. 1 may be used in any suitable video applications, such as video communication, security, surveillance and entertainment, and even applications that would especially benefit from faster rate control and encoding (e.g., high definition television (HDTV), real-time video streaming, video on demand (VOD), etc.) In another example, the parallel encoding system may provide a cloud-based encoding to a plurality of remote users etc.

Figure 2:
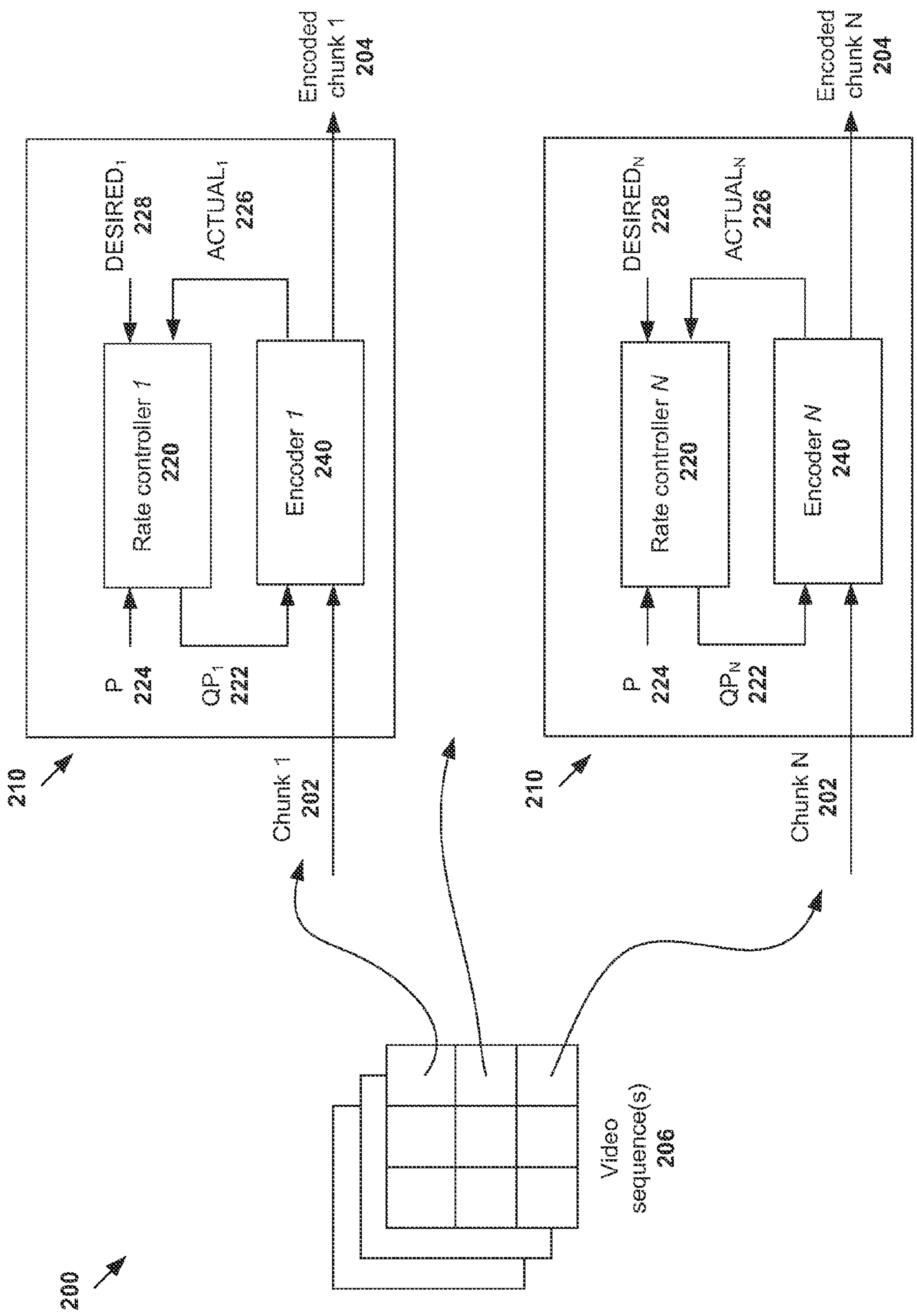
FIG. 2 is a schematic diagram of an example parallel encoding system in which rate control is performed, in accordance with at least some embodiments of the present disclosure.

FIG. 2 is a schematic diagram of example parallel encoding system 200 in which rate control according to FIG. 1 may be performed, in accordance with at least some embodiments of the present disclosure. Parallel encoding system 200 comprises multiple processing units 210 capable of operating in parallel. Each processing unit 210 includes rate controller 220 and encoder 240 that interact with each other to encode chunks 202 of video sequence 206 into encoded chunks 204.

Processing units 210, labelled 1 to N, may be implemented using software, hardware or a combination of both. The number of processing units 210 (e.g., N) may be any suitable number depending on the application and underlying system hardware, etc. At each processing unit 210, rate controller 220 determines the value of QP 222 for encoder 240 to encode chunk 204 into encoded chunk 206. For example, rate controller 1 determines $QP_1$ for encoder 1 to encode chunk 1 into encoded chunk 1, and so on.

Throughout the present disclosure, the term "chunk," such as chunk 202, may refer generally to a subdivision of a video sequence, such as video sequence 206. For example, video sequence 206 includes multiple frames, which may be further divided into macroblocks (typically of 16×16 pixels but not limited to this size) and slices that includes an arbitrary number of macroblocks, etc. In practice, "chunk" 202 may be of any suitable size, such as large as a whole video frame, as small as a macroblock, or anything in between. Of course, chunk 202 may be larger than a whole video frame or smaller than a macroblock.

Although chunks 202 of different processing units 210 are shown as having the same size in FIG. 2, they may be of different sizes. For example, using MPEG-2, chunk 1 may be a macroblock and chunk N may be a slice or group of slices, etc. As such, the size of the chunk may be considered as a unit of rate control. Chunks 202 may be assigned to different processing units 210 using any suitable assignment algorithm.

In accordance with at least some embodiments of the present disclosure, rate controller 220 determines QP 222 based on the measure of the parallelism of parallel encoders 240, represented as 'P' 224 in FIG. 2. For example, P 224 may be determined based on the number of chunks encoded in parallel by parallel encoders 240. The interaction between QP 222 and P 224 in parallel encoding system 200 relates to the stability of the control loop between rate controller 220 and encoder 240.

In more detail, in a sequential encoding system (i.e., a system having only one processing unit 210, i.e., N=1), observe that chunks 202 are encoded sequentially one after another. For example, when encoding the i-th chunk using MPEG-2, rate controller 202 sets the value of QP as follows:

$$QP[i]=\text{GAIN}*\text{ERROR}[i]. \quad (1)$$

In equation (1), GAIN is an appropriate (generally positive) constant and runs the encoder at quality QP[i]. Encoder 240 generates encoded chunk 204 of size ACTUAL[i] bits 226, which depends on not only on QP[i] but also the complexity of the video sequence. After encoding the i-th chunk, rate controller 220 updates error parameter ERROR[i] based on the difference between ACTUAL[i] 226 and the desired size for the i-th chunk DESIRED[i] 228:

$$\text{ERROR}[i+1]=\text{ERROR}[i]+(\text{ACTUAL}[i]-\text{DESIRED}[i]). \quad (2)$$

ERROR[i+1] is used to compute QP[i+1] for the subsequent chunk i+1. If encoder 240 systematically outputs more bits than desired (i.e., ACTUAL[i]>DESIRED[i]), ERROR [i+1] grows over time. This increases the value of QP 222 for subsequent chunks 202, which causes these chunks 202 to use fewer bits to achieve the desired output rate.

By contrast, for parallel encoding system 200 with N>1 encoders in FIG. 2, observe that chunk 202 (e.g., chunk 1) is encoded concurrently with another chunk 202 (e.g., chunk N) and does not use the feedback from the other processing unit 210 (e.g., processing unit N). For example, $QP_1$ for encoding chunk 1 is not determined based on feedback $ACTUAL_N$. It turns out that this lack of coordination is approximately equivalent mathematically to using a value of GAIN that is P times larger than in the sequential case, where P is the maximum number of chunks that are scheduled to execute concurrently. In other words, if calculation QP[i]=GAIN*ERROR [i] in equation (1) is simply repeated at each processing unit 210, the "effective gain" of the system 200 is approximately GAIN*P. As such, although GAIN may be a stable value for a sequential system, the same cannot be said for parallel system 200.

Further, the following example demonstrates the importance of the selection of GAIN. For simplicity and illustration purposes, consider the case where N=1. Assume the range of QP is [0 . . . 10], the encoder outputs (10-QP) bits per chunk, ERROR[0] is initially 0, GAIN=2 and DESIRED=5 bits/chunk. Table 1 shows values for ERROR[i], QP[i], ACTUAL [i] for i=0, . . . , 5 that are calculated using equations (1) and (2):

TABLE 1

Oscillation of QP due to instability

| i | ERROR[i] | QP[i] = GAIN*ERROR[i] | ACTUAL[i] = 10 − QP |
|---|---|---|---|
| 0 | 0 | 0 | 10 |
| 1 | 5 | 10 | 0 |
| 2 | 0 | 0 | 10 |
| 3 | 5 | 10 | 0 |
| 4 | 0 | 0 | 10 |
| 5 | 5 | 10 | 0 |

The above cycle repeats with QP oscillating between the extreme values 0 and 10, never converging to an "optimal" value such as QP=5. In this example, it turns out that values for GAIN<2 would eventually converge to a stable value of QP, whereas larger GAIN>=2 never converges. As such, if GAIN becomes too large, the control loop between rate controller 220 and encoder 240 becomes unstable.

To improve stability for parallel encoding system 200 in FIG. 2, rate controller 220 determines QP 222 based on P 224 according to equation (3) below.

$$QP=(\text{GAIN}/P)*\text{ERROR}. \quad (3)$$

In some embodiments and as mentioned above, P may be the maximum number of chunks that parallel encoders 240 may be capable of processing in parallel. In the example shown in FIG. 2, P may be up to N, i.e., the number of encoders 240. Recall that the control loop becomes unstable if GAIN is too large. Dividing the gain by P achieves the effect of stabilizing the control loop no matter what P is.

Figure 3:
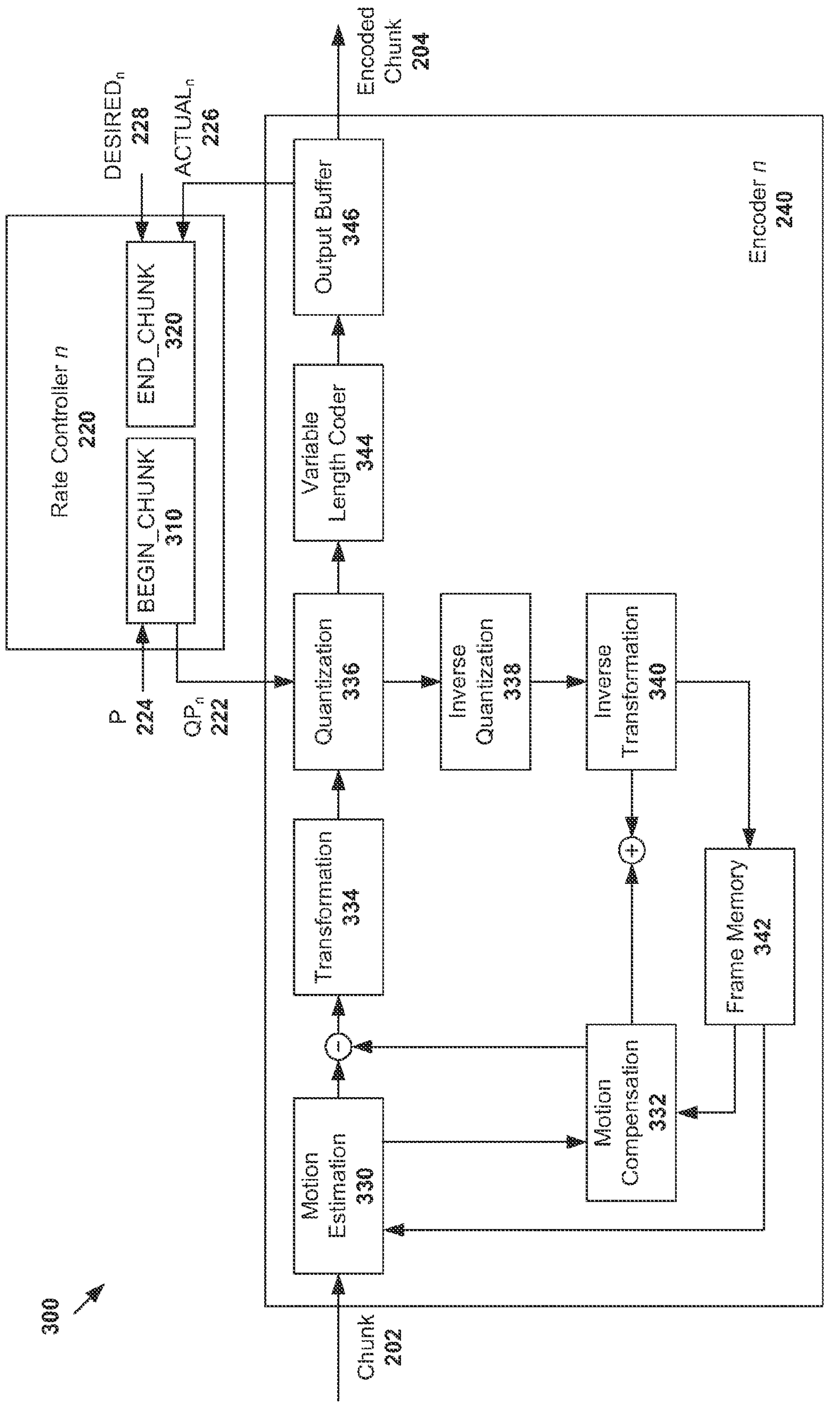
FIG. 3 is a schematic diagram of a detailed example of a processing unit that includes a rate controller and an encoder in FIG. 2, in accordance with at least some embodiments of the present disclosure.

FIG. 3 is a schematic diagram of a detailed example of processing unit 210 that includes rate controller 220 and encoder 240, in accordance with at least some embodiments of the present disclosure. In both FIG. 2 and FIG. 3, although rate controller 220 and encoder 240 are shown as separate blocks, it should be understood that rate controller 220 may also be part of encoder 240.

In the example in FIG. 3, rate controller 220 further includes BEGIN_CHUNK( ) 310 and END_CHUNK( ) 320 that are executed before and after a chunk is encoded, respectively. Similar to in FIG. 2, rate controller 220 determines QP 222 (e.g., $QP_n$) based on P 224 for encoder 240 to encode chunk 302 into encoded chunk 304.

Encoder 240 may employ any suitable video coding standard, such as MPEG-1, MPEG-2, MPEG-4, H.264/AVC (Advanced Video Coding), etc. For example, an MPEG-2 video encoder generally includes the following components: motion estimation 330, motion compensation 332, transformation 334, quantization 336, inverse quantization 338, inverse transformation 340, frame memory 342, variable length coder 344 and output buffer 346. Components 330 to 346 may be implemented using any suitable software, hardware or a combination of both.

In general, video sequences contain a significant amount if redundancies within and between frames, such as temporal and spatial redundancies. Intra-frame compression reduces spatial redundancies within a frame by employing transform coding while inter-frame compression takes advantage of temporal redundancies by coding the difference between a predicted frame and the current frame. In the example in FIG. 3, motion estimation 330 searches for the best motion vector with reference to the previous frame, and motion compensation 332 is to reduce temporal redundancies. Transformation 334 performs transform coding (e.g., discrete cosine transform) to encode motion-compensated prediction of the difference frame to reduce spatial redundancies.

Following transformation 334, resulting transform coefficients are quantized by quantization 336, the results of which are encoded by variable length coder 344. Encoded chunks 304 are stored in output buffer 346 before transmission or storage. Inverse quantization 338 and inverse transformation 340 (e.g., inverse discrete cosine transform) are to reconstruct reference information for later use. Motion compensation 330 may also process the reference information for use in motion estimation 332.

In the example in FIG. 3, when encoder 240 requires the value of QP 222 for quantization 336 in order to encode chunk 202, encoder 240 calls BEGIN_CHUNK( ) 310 which returns the value of QP 222. After encoding chunk 202, encoder 240 calls END_CHUNK(ACTUAL) 320, where ACTUAL is the actual number of bits that were required to encode chunk 202. BEGIN_CHUNK( ) 310 and END_CHUNK( ) 320 may be called concurrently by different parallel encoders 240 for multiple chunks 202 in any order, but END_CHUNK( ) must be called after the corresponding BEGIN_CHUNK( ) of the same chunk 202.

BEGIN_CHUNK( ) 310 and END_CHUNK( ) 320 may be implemented using any suitable software, hardware or a combination of both. For example, BEGIN_CHUNK( ) 310 and END_CHUNK( ) 320 may be function calls executed by encoder 240. Table 2 shows example pseudo-code of BEGIN_CHUNK( ) 310 and END_CHUNK( ) 320, in accordance with at least some embodiments of the present disclosure. Variables OUTSTANDING and P (lines 3 and 6, Table 2) are shared between parallel rate controllers 220 and encoders 240.

TABLE 2

Pseudo-code of BEGIN_CHUNK( ) and END_CHUNK( )

```
line  variables:
1         ;; OUTSTANDING corresponds to the number of chunks that have
2         ;; been started but not yet completed
3         shared integer OUTSTANDING initially 0;
4         ;; P corresponds to the maximum number of chunks ever
5     processed in parallel.
6         ;; P is therefore an example measure of the parallelism of the encoder.
          shared integer P initially 1;
7
8         ;; ERROR is the total discrepancy between the desired and the actual
9         ;; number of bits produced during the execution of the encoder.
          shared real ERROR initially 0;
10
11        ;; L is a lock, used to enforce mutual exclusion between multiple
12        ;; chunks being encoded in parallel.
          lock L initially not held.
13
14      functions:
15          ;; Before encoding a chunk, the encoder calls BEGIN_CHUNK( ),
16          ;; which returns the estimated value of QP
17          BEGIN_CHUNK( ):
18              ;; enforce mutual exclusion
                lock(L);
19
20              ;; Compute P as the maximum number of chunks that were ever
21              ;; executed in parallel
22              OUTSTANDING := OUTSTANDING + 1;
                if (OUTSTANDING > P) then P := OUTSTANDING;
23
24              ;; Compute QP taking the value of P into account
                QP = (GAIN / P) * ERROR;
25
26              unlock(L);
                return QP;
27
28          ;; After encoding a chunk, the encoder call END_CHUNK,
29          ;; passing a parameter ACTUAL which denotes the actual
30          ;; number of bits generated while encoding the chunk
31          END_CHUNK(ACTUAL):
                lock(L);
32
33              ;; Accumulate error since the beginning of time
                ERROR := ERROR + (ACTUAL − DESIRED);
34
35              ;; Note that the chunk has completed, and thus it is no longer
36              ;; outstanding
37              OUTSTANDING := OUTSTANDING − 1;
                unlock(L);
```

Figure 4:
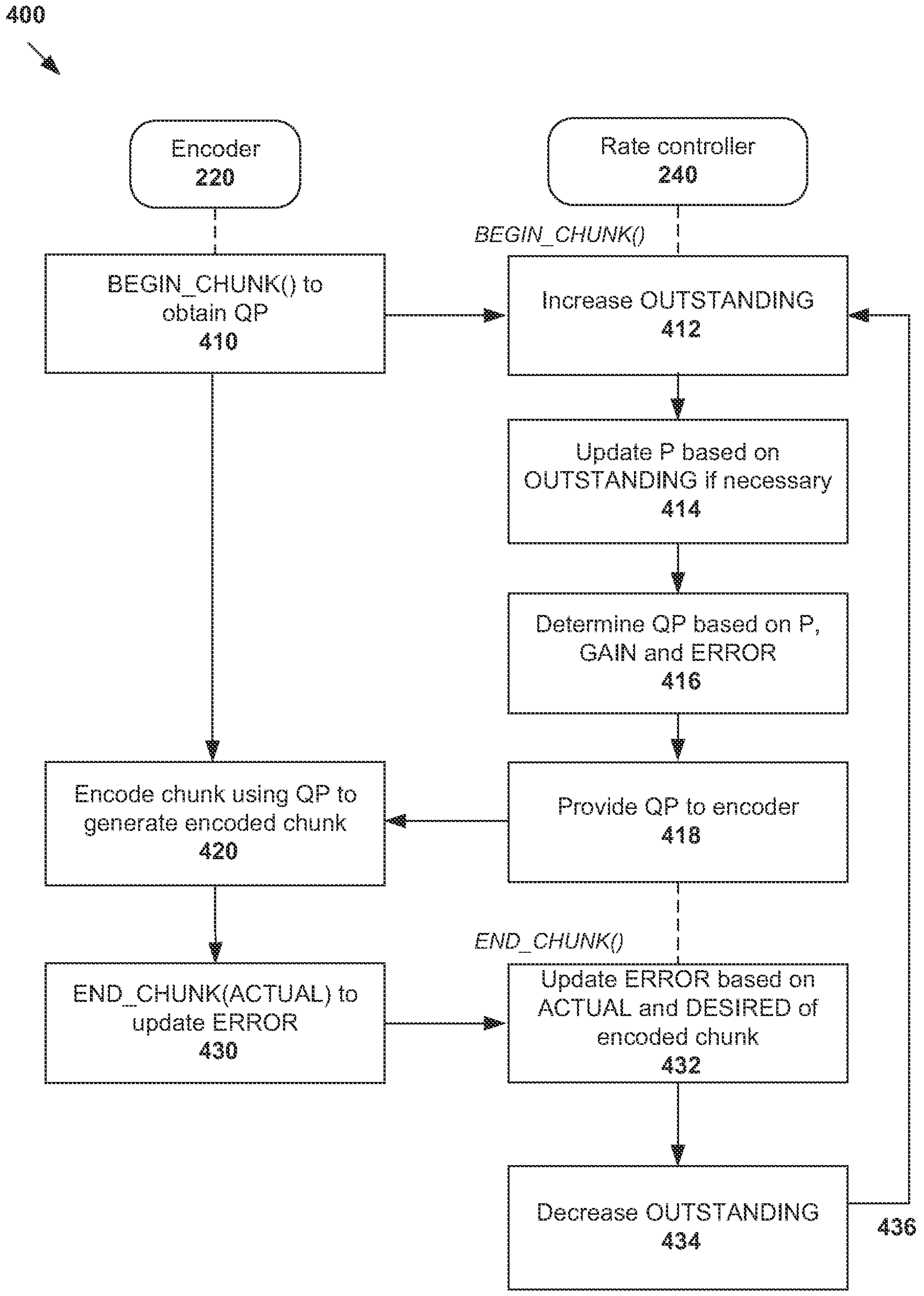
FIG. 4 is a flowchart of an example process to perform rate control using the rate controller and encoder in FIG. 3, in accordance with at least some embodiments of the present disclosure.

FIG. 4 is a flowchart of an example process 400 to perform rate control using rate controller 220 and encoder 240 in FIG. 2 and FIG. 3, in accordance with at least some embodiments of the present disclosure. Process 400 may include one or more operations, functions, or actions illustrated by one or more blocks, such as blocks 410 to 434 performed by encoder 240, and blocks 412 to 418 and 432 to 434 performed by rate controller 220. Although the blocks are illustrated in sequential orders, these blocks may also be performed in parallel, and/or in a different order than those described herein. Also, the various blocks may be combined into fewer blocks, divided into additional blocks, repeated and/or eliminated based upon the desired implementation. Blocks 410 to 434 may be repeated for each chunk 202 encoded by encoder 240.

At block 410 in FIG. 4, encoder 240 (e.g., encoder n) parallel encoding system 200 invokes BEGIN_CHUNK( ) to obtain the value of QP (e.g., $QP_n$).

At blocks 412 to 418 in FIG. 4, corresponding rate controller 220 (e.g., rate controller n) performs BEGIN_CHUNK( ). At block 412 (related to lines 1 to 3 and 21 in Table 2), counter OUTSTANDING represents the outstanding number of chunks for which encoding has started but not yet completed and is increased every time BEGIN_CHUNK( ) is called. At block 414 (related to lines 4 to 6 and 22 in Table 2), P is initially 1 and increases according to OUTSTANDING. For example, if there are 5 parallel encoders 240, rate controller 220 increases the value of P according to OUTSTANDING, up to a maximum of 5. At blocks 416 and 418 (related to lines 23 to 24 in Table 2), rate controller 220 determines QP using equation (3) and provides the result to encoder 240.

At block 420 in FIG. 4, encoder 240 (e.g., encoder n) encodes chunk 202 to generate encoded chunk 204 based on QP (e.g., $QP_n$) provided by rate controller 220 (e.g., rate controller n). For example, as explained with reference to FIG. 3, motion estimation 330, motion compensation 332, transformation 334, quantization 336, inverse quantization 338, inverse transformation 340, frame memory 342, variable length coder 344 and output buffer 346 in encoder 240 may be used.

At block 430 in FIG. 4, encoder 240 (e.g., encoder n) invokes END_CHUNK(ACTUAL) after generating encoded chunk 204.

At blocks 432 and 434, corresponding rate controller 220 (e.g., rate controller n) performs END_CHUNK(ACTUAL). At block 432 (related to line 33 in Table 2), rate controller 220 (e.g., rate controller n) updates ERROR based on ACTUAL size and DESIRED size of encoded chunk 204. At block 434 (related to line 36 in Table 2), rate controller 220 (e.g., rate controller n) decreases counter OUTSTANDING to indicate the completion of the encoding process of the current chunk. As indicated at 436, since OUTSTANDING is a parameter (related to line 3 in Table 2) shared among multiple rate controllers 220, BEGIN_CHUNK( ) will use this latest value the next time it is invoked.

It will be appreciated that any suitable parallel computing techniques may be used to implement BEGIN_CHUNK( ) and END_CHUNK( ) in rate controller 220 in each processing unit 210. For example, processing units 210 may be implemented as parallel programs called threads. Further, since BEGIN_CHUNK( ) and END_CHUNK( ) may be called by multiple encoders 240 concurrently, lock L is used to provide mutual exclusion (see lines 18, 25, 31, 37, Table 2). In general, a lock is a programming language construct that allows one encoder 240 to take control of a variable and prevent other encoders 240 from reading or writing it. For example, if one encoder 240 locks variables OUTSTANDING and P, no other encoders 240 will be able to update them to avoid data errors.

Figure 5:
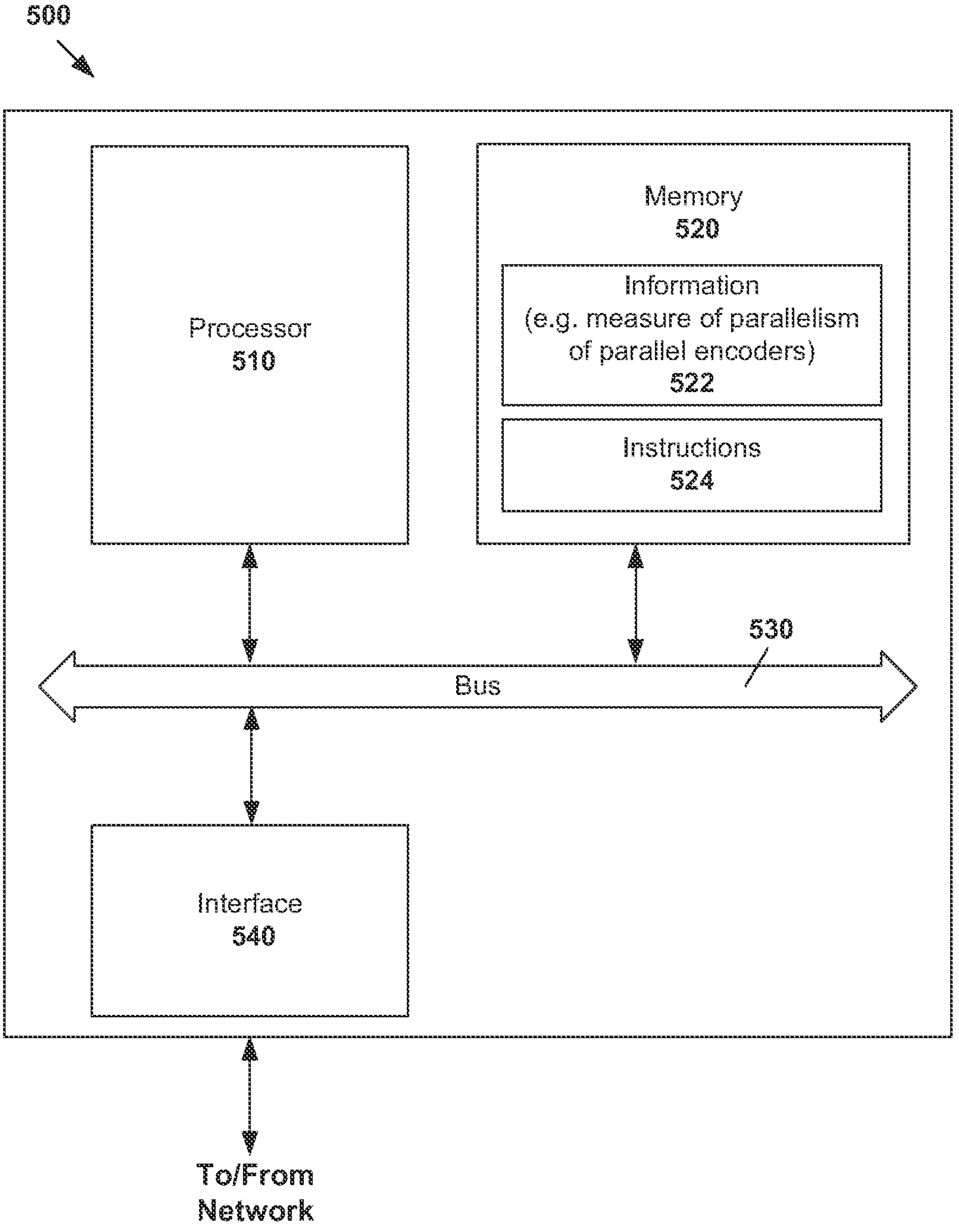
FIG. 5 is an example system configured to perform rate control in a parallel encoding system comprising a plurality of parallel encoders, in accordance with at least some embodiments of the present disclosure.

The above examples can be implemented by hardware, software or firmware or a combination thereof. FIG. 5 is an example system configured to perform network introspection in an operating system, in accordance to at least some embodiments in the present disclosure. Example system 500 may include processor 510, memory 520, network interface device 540, and bus 530 that facilitate communication among these illustrated components and other components.

Processor 510 is to perform processes described herein with reference to FIG. 1 to FIG. 4. Although one processor 510 is shown, multiple processors 510 may be used to implement parallel encoding system 200 explained with reference to FIGS. 2 and 3. Memory 520 may store any information necessary to perform rate control in parallel encoding system 200 as described with reference to FIG. 1 to FIG. 4, such as the measure of parallelism of the parallel encoders 240 (P) and other parameters in Table 2 etc. Memory 520 may further store machine-readable instructions 524 executable by processor 510 to cause processor 510 to perform processes described herein with reference to FIG. 1 to FIG. 4.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method to perform rate control in a parallel encoding system including a plurality of parallel encoders, the method comprising:

determining a quantization parameter for one of the plurality of parallel encoders based on a measure of parallelism associated with the plurality of parallel encoders, wherein the measure of parallelism corresponds to a maximum number of chunks of a video sequence that the plurality of parallel encoders are capable of processing in parallel; and providing the quantization parameter to the one of the plurality of parallel encoders to encode a chunk of the video sequence to generate an encoded chunk based on the quantization parameter.

2. The method of claim 1, wherein determining the quantization parameter further comprises:

determining an outstanding number of chunks for which encoding has started but not yet completed by the plurality of parallel encoders; and increasing the measure of parallelism according to the outstanding number of chunks up to a maximum number of chunks that the plurality of parallel encoders ever processed in parallel.

3. The method of claim 1, wherein determining the quantization parameter further comprises:

determining the quantization parameter by dividing a gain parameter by the measure of parallelism and multiplying a result of the division by an error parameter.

4. The method of claim 3, wherein the method further comprises:

updating the error parameter after the chunk of the video sequence is encoded based on a desired size and an actual size of the encoded chunk.

5. The method of claim 1, wherein the plurality of encoders employ at least one of the following video coding standards: MPEG-1, MPEG-2, MPEG-4 and H.264/AVC.

6. The method of claim 1, wherein the parallel encoding system provides a cloud-based encoding service to a plurality of remote users.

7. A non-transitory computer-readable storage medium that includes a set of instructions which, in response to execution by a processor, causes the processor to perform a rate control method in a parallel encoding system including a plurality of parallel encoders, the method comprising:

determining a quantization parameter for one of the plurality of parallel encoders based on a measure of parallelism associated with the plurality of parallel encoders, wherein the measure of parallelism corresponds to a maximum number of chunks of a video sequence that the plurality of parallel encoders are capable of processing in parallel; and providing the quantization parameter to the one of the plurality of parallel encoders to encode a chunk of the video sequence to generate an encoded chunk based on the quantization parameter.

8. The non-transitory computer-readable storage medium of claim 7, wherein determining the quantization parameter further comprises:

determining an outstanding number of chunks for which encoding has started but not yet completed by the plurality of parallel encoders; and increasing the measure of parallelism according to the outstanding number of chunks up to a maximum number of chunks that the plurality of parallel encoders ever processed in parallel.

9. The non-transitory computer-readable storage medium of claim 7, wherein determining the quantization parameter further comprises:

determining the quantization parameter by dividing a gain parameter by the measure of parallelism and multiplying a result of the division by an error parameter.

10. The non-transitory computer-readable storage medium of claim 9, wherein the method further comprising:

updating the error parameter after the chunk of video sequence is encoded based on a desired size and an actual size of the encoded chunk.

11. The non-transitory computer-readable storage medium of claim 7, wherein the plurality of encoders employ at least one of the following video coding standards: MPEG-1, MPEG-2, MPEG-4 and H.264/AVC.

12. The non-transitory computer-readable storage medium of claim 7, wherein the parallel encoding system provides a cloud-based encoding service to a plurality of remote users.

13. A parallel encoding system, comprising:

a plurality of encoders configured to encode chunks of a video sequence; and a plurality of rate controllers each configured to perform rate control for the plurality of encoders by determining a quantization parameter for one of the plurality of parallel encoders based on a measure of parallelism associated with the plurality of parallel encoders, wherein the measure of parallelism corresponds to a maximum number of chunks of a video sequence that the plurality of parallel encoders are capable of processing in parallel, and providing the quantization parameter to the one of the plurality of parallel encoders to encode a chunk of the video sequence to generate an encoded chunk based on the quantization parameter.

14. The parallel encoding system of claim 13, wherein each of the plurality of rate controllers determines the quantization parameter by:

determining an outstanding number of chunks for which encoding has started but not yet completed by the plurality of parallel encoders; and increasing the measure of parallelism according to the outstanding number of chunks up to a maximum number of chunks that the plurality of parallel encoders ever processed in parallel.

15. The parallel encoding system of claim 13, wherein each of the plurality of rate controllers determines the quantization parameter by determining the quantization parameter by dividing a gain parameter by the measure of parallelism and multiplying a result of the division by an error parameter.

16. The parallel encoding system of claim 15, wherein each of the plurality of rate controllers is further configured to update the error parameter after the chunk of the video sequence is encoded based on a desired size and an actual size of the encoded chunk.

17. The parallel encoding system of claim 13, wherein the plurality of encoders employ at least one of the following video coding standards: MPEG-1, MPEG-2, MPEG-4 and H.264/AVC.

* * * * *